(12) United States Patent
Taguchi et al.

(10) Patent No.: US 10,183,622 B2
(45) Date of Patent: Jan. 22, 2019

(54) VEHICLE DISPLAY DEVICE

(71) Applicant: DENSO CORPORATION, Kariya, Aichi-pref. (JP)

(72) Inventors: Kiyotaka Taguchi, Kariya (JP); Akihiro Ogasawara, Kariya (JP); Gouji Sagai, Kariya (JP); Kentaro Kajita, Kariya (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 0 days.

(21) Appl. No.: 15/322,190

(22) PCT Filed: Jun. 24, 2015

(86) PCT No.: PCT/JP2015/003157
§ 371 (c)(1),
(2) Date: Dec. 27, 2016

(87) PCT Pub. No.: WO2016/006182
PCT Pub. Date: Jan. 14, 2016

(65) Prior Publication Data
US 2017/0113612 A1    Apr. 27, 2017

(30) Foreign Application Priority Data
Jul. 11, 2014   (JP) .................. 2014-143464

(51) Int. Cl.
*B60R 1/00*    (2006.01)
*B60K 37/02*    (2006.01)
(Continued)

(52) U.S. Cl.
CPC ............... *B60R 1/00* (2013.01); *B60K 37/02* (2013.01); *B62D 1/046* (2013.01); *G09G 3/20* (2013.01);
(Continued)

(58) Field of Classification Search
None
See application file for complete search history.

(56) References Cited

U.S. PATENT DOCUMENTS

2007/0085708 A1* 4/2007 Kato .................... G01C 21/265
340/995.1
2008/0150709 A1  6/2008 Yamamoto et al.
(Continued)

FOREIGN PATENT DOCUMENTS

JP         200541355 A     2/2005
JP       2008139390 A     6/2008
(Continued)

*Primary Examiner* — Tize Ma
(74) *Attorney, Agent, or Firm* — Harness, Dickey & Pierce, P.L.C.

(57) ABSTRACT

A vehicle display device includes: a display; a vehicle information image generator; an external image obtaining device; a display controller that displays the vehicle information image and the external image on the display; and an external image display determination device that determines whether the display controller is going to display the not displayed external image. When the display controller is going to display the not displayed external image, the display controller displays the external image, which the display controller is going to display, on the display with gradually increasing brightness of the external image from the brightness that is lower by a predetermined amount than original brightness to predetermined brightness that is determined based on the original brightness.

15 Claims, 8 Drawing Sheets

(51) Int. Cl.
  *G09G 5/02* (2006.01)
  *G09G 5/10* (2006.01)
  *G09G 5/36* (2006.01)
  *G09G 5/377* (2006.01)
  *G09G 5/00* (2006.01)
  *B62D 1/04* (2006.01)
  *G09G 3/20* (2006.01)
  *G09G 3/34* (2006.01)

(52) U.S. Cl.
  CPC ............... *G09G 5/00* (2013.01); *G09G 5/02* (2013.01); *G09G 5/10* (2013.01); *G09G 5/36* (2013.01); *G09G 5/363* (2013.01); *G09G 5/377* (2013.01); *B60K 2350/106* (2013.01); *B60K 2350/1008* (2013.01); *B60K 2350/1028* (2013.01); *B60K 2350/1064* (2013.01); *B60K 2350/2013* (2013.01); *B60K 2350/2039* (2013.01); *B60K 2350/2056* (2013.01); *B60K 2350/2069* (2013.01); *B60K 2350/2095* (2013.01); *B60K 2350/352* (2013.01); *B60K 2350/357* (2013.01); *B60R 2300/102* (2013.01); *B60R 2300/80* (2013.01); *B60Y 2400/92* (2013.01); *G09G 3/3406* (2013.01); *G09G 2320/0626* (2013.01); *G09G 2320/0653* (2013.01); *G09G 2320/0686* (2013.01); *G09G 2320/08* (2013.01); *G09G 2340/0464* (2013.01); *G09G 2340/10* (2013.01); *G09G 2340/12* (2013.01); *G09G 2340/14* (2013.01); *G09G 2354/00* (2013.01); *G09G 2380/10* (2013.01)

(56) References Cited

U.S. PATENT DOCUMENTS

| | | |
|---|---|---|
| 2008/0161997 A1 | 7/2008 | Wengelnik et al. |
| 2008/0197990 A1 | 8/2008 | Yamamoto et al. |
| 2008/0204205 A1 | 8/2008 | Yamamoto et al. |
| 2008/0252439 A1 | 10/2008 | Yamamoto et al. |
| 2008/0309475 A1 | 12/2008 | Kuno et al. |
| 2009/0073327 A1* | 3/2009 | Watanabe ............ G01C 21/36 348/837 |
| 2010/0103204 A1 | 4/2010 | Shibata et al. |
| 2010/0265053 A1 | 10/2010 | Yamamoto et al. |
| 2011/0163864 A1 | 7/2011 | Watanabe et al. |
| 2012/0113261 A1* | 5/2012 | Satoh .................... B60R 1/00 348/148 |
| 2012/0229645 A1* | 9/2012 | Yamada ............. B60Q 1/2665 348/148 |
| 2013/0057638 A1* | 3/2013 | Tamkivi ............ H04W 4/027 348/14.02 |
| 2015/0158387 A1 | 6/2015 | Satoh et al. |

FOREIGN PATENT DOCUMENTS

| | | |
|---|---|---|
| JP | 2008158171 A | 7/2008 |
| JP | 200942681 A | 2/2009 |
| JP | 4316619 B2 | 8/2009 |
| JP | 2009179240 A | 8/2009 |
| JP | 2012194060 A | 10/2012 |
| JP | 5142042 B2 | 2/2013 |
| JP | 2013100090 A | 5/2013 |
| JP | 5227164 B2 | 7/2013 |
| JP | 5344372 B2 | 11/2013 |
| WO | WO-2014002711 A1 | 1/2014 |

* cited by examiner

FIG. 6 G3
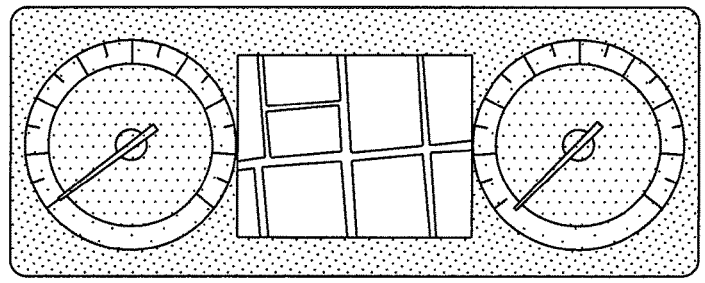
FIG. 7
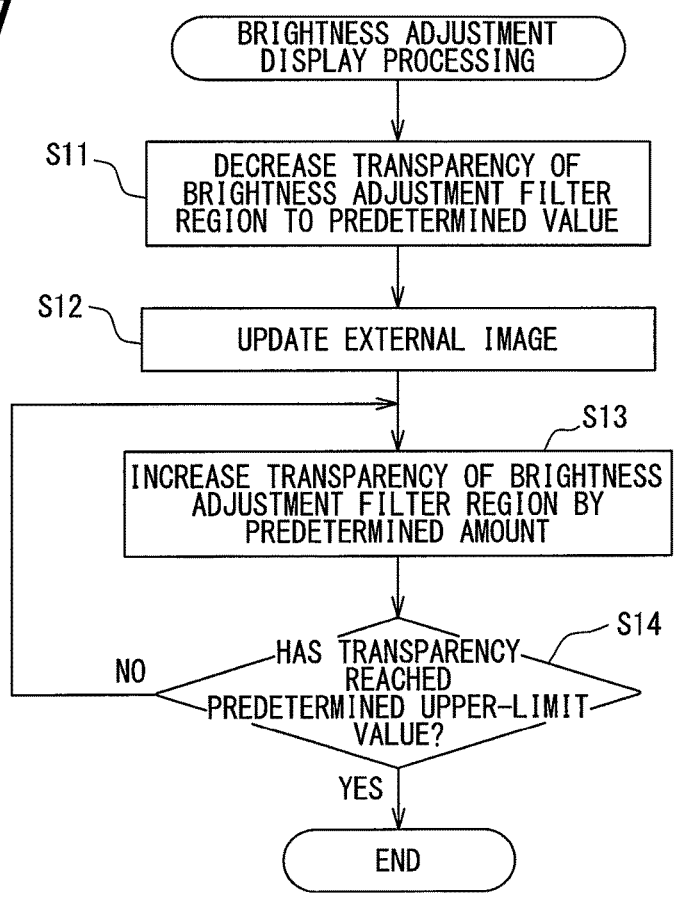

Bhi: TARGET HIGH VALUE
Blow: TARGET LOW VALUE

VEHICLE DISPLAY DEVICE

CROSS REFERENCE TO RELATED APPLICATIONS

This application is a U.S. National Phase Application under 35 U.S.C. 371 of International Application No. PCT/JP2015/003157 filed on Jun. 24, 2015 and published in Japanese as WO 2016/006182 A1 on Jan. 14, 2016. This application is based on and claims the benefit of priority from Japanese Patent Application No. 2014-143464 filed on Jul. 11, 2014. The entire disclosures of all of the above applications are incorporated herein by reference.

TECHNICAL FIELD

The present disclosure relates to a vehicle display device, more particularly, to a vehicle display device displaying a vehicle information image.

BACKGROUND ART

A vehicle display device proposed recently (see, for example, Patent Literature 1) displays an image (vehicle information image) representing vehicle information, such as a vehicle speed and an engine rotation speed, and an image (external image) obtained from an external device at a time on a meter display disposed in front of a driver's seat within an instrument panel of a vehicle.

The external device referred to herein includes various devices, examples of which include but not limited to a navigation device and a smartphone.

An external image is not always displayed on a screen of the meter display. That is to say, a transient period occurs when the screen of the meter display is switched from a state where an external image is not displayed to a state where the external image is displayed.

An external image is newly displayed, for example, when external image data is inputted from the external device from which the external image has not been outputted. A study is now under way on a vehicle display device configured to hide an external image which is relatively less useful than a vehicle information image when a driving load on a driver is determined to be high to let the driver concentrate on a driving operation. According to the configuration as above, the hidden external image is displayed again on the meter display when a driving load on the driver is determined to fall within an allowable range.

In a case where an external image newly displayed by switching the display screens is a bright image in comparison with a vehicle information image, the driver may feel the external image too bright, which raises a problem that visibility of the vehicle information image is reduced.

The driver feels a displayed external image too bright in cases other than transition of an external image from a hidden state to a displayed state. For example, when an external image is switched to a new image different from an image which has been displayed up to present time, the driver may also feel the external image too bright.

That is to say, a bright image is displayed suddenly by switching external images when brightness of an external image displayed after switching is higher than brightness of an external image displayed before switching. Hence, the driver also feels the external image too bright. An external image is switched to an image different from an image which has been displayed up to present time, for example, when a user makes an operation to change the external image on the external device which is outputting the external image.

In order to address the problem that the driver feels an external image too bright when an external image which has not been displayed is displayed due to transition of the external image from a hidden state to a displayed state or transition of screen types as described above, an amount of light of a backlight may be reduced once when the external image is newly displayed. When configured in such a manner, a possibility that the driver feels the external image too bright may be reduced.

However, when an amount of light of the backlight is reduced, brightness of an entire display region of the meter display is decreased and a vehicle information image also becomes dark. After all, visibility of the vehicle information image is reduced.

PRIOR ART LITERATURES

Patent Literature

Patent Literature 1: Japanese Patent No. 4316619

SUMMARY OF INVENTION

It is an object of the present disclosure to provide a vehicle display device not only capable of displaying an external image obtained from an external device and a vehicle information image at a time, but also capable of reducing a possibility that a driver feels an external image too bright in a process of displaying an external image while maintaining visibility of a vehicle information image.

According to an aspect of the present disclosure, a vehicle display device includes: a display that displays an image; a vehicle information image generator that generates a vehicle information image indicative of vehicle information; an external image obtaining device that obtains an external image, which is an image to be displayed on the display, from an external device connected to the vehicle display device; a display controller that displays at least the vehicle information image on the display, and displays the vehicle information image and the external image on the display when the external image obtained by the external image obtaining device needs to be displayed on the display; and an external image display determination device that determines whether the display controller is going to display the external image which was not displayed at a predetermined past time. When the external image display determination device determines that the display controller is going to display the external image which was not displayed at the predetermined past time, the display controller displays the external image, which the display controller is going to display, on the display with gradually increasing brightness of the external image from the brightness that is lower by a predetermined amount than original brightness of the external image which was not displayed to predetermined brightness that is determined based on the original brightness of the external image which was not displayed.

Owing to the configuration as above, even when an external image which is going to be displayed newly is an image at relatively high brightness, a bright image is not displayed suddenly on the display portion. Hence, a possibility that a driver feels the external image too bright in the process of displaying the external image can be reduced.

In addition, because an amount of light of a backlight is not adjusted in the configuration above, a display form of the vehicle information image can be maintained before and after a new external image is displayed.

That is to say, the vehicle display device is not only capable of displaying an external image obtained from an external device and a vehicle information image at a time, but also capable of reducing a possibility that the driver feels an external image too bright in the process of displaying the external image while maintaining visibility of the vehicle information image.

BRIEF DESCRIPTION OF DRAWINGS

The above and other objects, features and advantages of the present disclosure will become more apparent from the following detailed description made with reference to the accompanying drawings. In the drawings:

FIG. 6 shows an example of the display image displayed on a display portion;

FIG. 7 is a flowchart depicting brightness adjustment display processing performed by the display control portion;

EMBODIMENTS FOR CARRYING OUT INVENTION

First Embodiment

Figure 1:
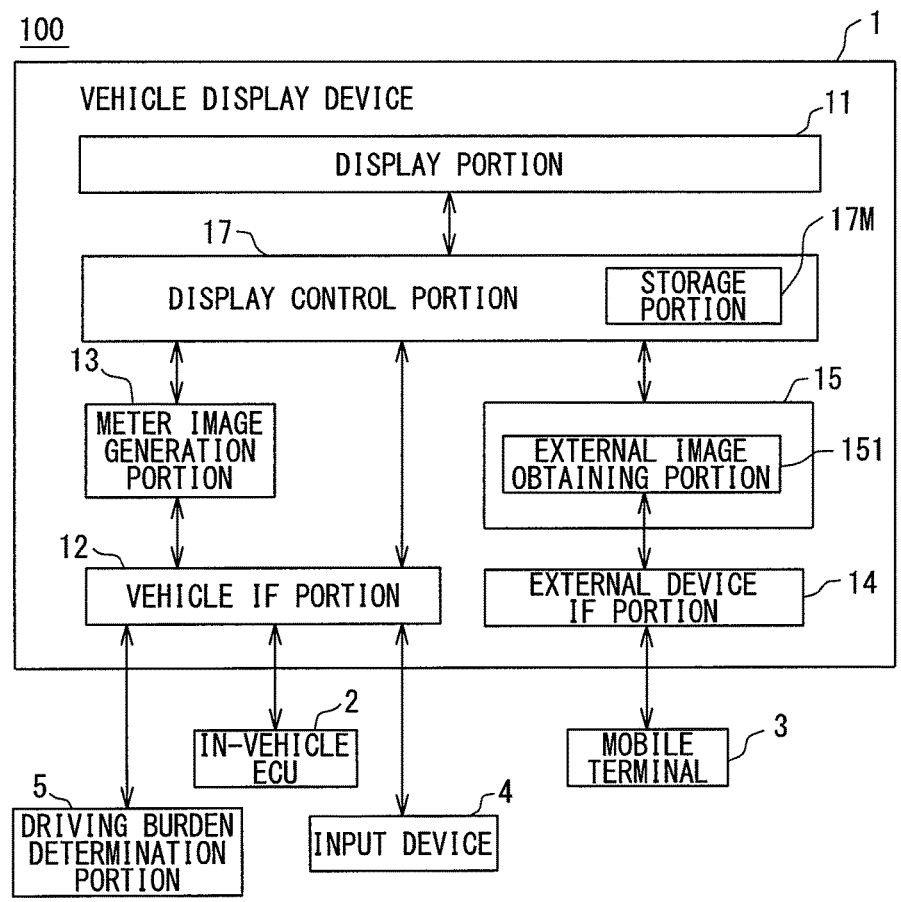
FIG. 1 is a block diagram showing an example of a schematic configuration of a vehicle display system according to a first embodiment.

Hereinafter, a first embodiment of the present disclosure will be described using the drawings. FIG. 1 is a view showing an example of a schematic configuration of a vehicle display system 100 of the present embodiment. As is shown in FIG. 1, the vehicle display system 100 includes a vehicle display device 1, an in-vehicle ECU (Electronic Control Unit) 2, a mobile terminal 3, an input device 4, and a driving load determination device 5. Hereinafter, a vehicle employing the vehicle display system 100 will be referred to as the own vehicle.

The vehicle display device 1 exchanges data individually with the in-vehicle ECU 2, the mobile terminal 3, the input device 4, and the driving load determination device 5 by wired or wireless communications. In the present embodiment, as an example, the in-vehicle ECU 2, the input device 4, and the driving load determination device 5 are individually connected to the vehicle display device 1 by wire while the mobile terminal 3 is connected to the vehicle display device 1 wirelessly using a known near field wireless communication technique.

Standards of wireless communications between the mobile terminal 3 and the vehicle display device 1 can be wireless LAN standards, such as IEEE802.11 or near field wireless communication standards, such as Bluetooth (registered trademark). In the present embodiment, the vehicle display device 1 and the mobile terminal 3 are configured to exchange data by wireless communications. It should be appreciated, however, that data may be exchanged by wired communications in other embodiments. Further, the vehicle display device 1 and the mobile terminal 3 may be configured to communicate via a network (so-called a wide area communication network), such as the Internet and a telephone network.

The in-vehicle ECU 2 acquires information on vehicle conditions (vehicle information) necessary for a driving operation from various sensors equipped to the own vehicle via an intra-vehicle communication network constructed in the own vehicle. Examples of the vehicle information acquired by the in-vehicle ECU 2 include but not limited to a running speed of the own vehicle, a rotation speed of an engine, a remaining amount of fuel, a temperature of an engine coolant, a total distance travelled by the own vehicle, a shift position, a position of a direction indicator lever, a locked or unlocked state of doors, and a lighting state (ON or OFF) of headlights.

The vehicle information also includes information notifying a driver of an abnormal state occurring in a drive system, such as the engine. Respective pieces of information belonging to the vehicle information specified as above are referred to as element information. The in-vehicle ECU 2 outputs the vehicle information to the vehicle display device 1 one after another. In the present embodiment, the own vehicle is a vehicle using the engine as a drive source. It should be appreciated, however, that the own vehicle may be a vehicle using a motor as the drive source or a vehicle including both an engine and a motor as the drive source.

The mobile terminal 3 is a mobile terminal known as a smartphone or a tablet terminal. A configuration and functions of a typical mobile terminal unnecessary to describe the present disclosure will be omitted herein for ease of description. A typical mobile terminal operates as the mobile terminal 3 of the present embodiment by running an application program (hereinafter, referred to simply as the application) enabling the typical mobile terminal to operate as the mobile terminal 3 included in the vehicle display system 100. The application is a CPU-executable program and may be stored in a ROM provided to the mobile terminal 3.

The mobile terminal 3 generates an image (mobile image) to be displayed on a display portion 11 provided to the vehicle display device 1 according to a control state and outputs data of the mobile image to the vehicle display device 1 one after another. A mobile image generated by the mobile terminal 3 includes a function selection image which displays functions available by the mobile terminal 3 on a screen to let a user to select a desired function and an image corresponding to the function selected by the user.

For example, the mobile terminal 3 has a location detection function furnished to the self and a map display function to display a map image near a present location using map data acquired from a map data providing server installed outside the self. When the user selects the map display function, the mobile terminal 3 generates a map image as a mobile image and outputs the map image to the vehicle display device 1. The mobile image corresponds to an example of an external image described below.

Data of a mobile image includes information (pixel information) indicating colors of respective pixels making up the mobile image. The pixel information is indicated by, for example, a combination of RGB and an alpha value A indicating transparency (that is, RGBA). It goes without saying that CMYK or other representation systems can be used instead of RGB.

As is known, when pixel information is represented by RGBA, a color of a pixel can be changed from a complete non-transparent state at 0% transparency to a complete transparent state at 100% transparency by adjusting the alpha value A. In a complete transparent state, a pixel is colorless and transparent independently of an RGB value set with the alpha value A. For example, the alpha value A is represented by eight bits and the transparency is 0% (that is, completely non-transparent) when the alpha value A is 255 and the transparency is 100% (that is, completely transparent) when the alpha value A is 0.

In the present embodiment, the mobile terminal 3 is adopted as an example of the external device connected to the vehicle display device 1. It should be appreciated, however, that the external device is not limited to the mobile terminal 3 and the external device can be other types of equipment known as a navigation device, an audio system, a perimeter monitoring system, and so on. The perimeter monitoring system includes, for example, a camera capturing images around the own vehicle and presents images captured by the camera to the driver.

The input device 4 is a mechanical switch (so-called a steering switch) provided in the vicinity of a steering wheel. When the driver operates the input device 4, the input device 4 outputs a control signal corresponding to the driver's operation to the vehicle display device 1.

The control signal is also transmitted to the mobile terminal 3 via the vehicle display device 1 and changes control states of the mobile terminal 3. The driver is thus able to make various directing operations on the mobile terminal 3 by operating the input device 4. Examples of the directing operations the driver can make on the mobile terminal 3 via the input device 4 include but not limited to directions to select a function to be performed by the mobile terminal 3, execute or suspend the selected function, and go back to the previous screen. For example, the driver is able to control the mobile terminal 3 to perform the map display function described above by operating the input device 4.

The control signal outputted from the input device 4 in response to a user's operation may be directly inputted into the mobile terminal 3 by bypassing the vehicle display device 1.

In the present embodiment, the steering switch is adopted as the input device 4. It should be appreciated, however, that the input device 4 is not limited to the steering switch and can be a touch panel provided to the vehicle or a touch panel provided to the mobile terminal 3. Further, the input device 4 may be a haptic device. It goes without saying that the input device 4 can be realized by combining various types of devices specified above.

The driving load determination device 5 is a device which determines whether it is a situation where a driving load on the driver is high. Whether or not it is a situation where a driving load on the driver is high may be determined by presumption on the basis of the vehicle information, for example, a vehicle speed or acceleration, a steering angle, a yaw rate, and a position of the direction indicator lever.

More specifically, thresholds used to determine whether a driving load is high or not may be preliminarily set for each of a vehicle speed or acceleration, a steering angle, and a yaw rate and the driving load determination device 5 may determine that a driving load is high when at least a predetermined number (for example, three) of parameters are above the corresponding thresholds.

The driving load determination device 5 also determines that it is a situation where a driving load is high when a position of the direction indicator lever is at a left-turning position or a right-turning position. Such a determination is made on the grounds that the direction indicator lever set at the left-turning position or the right-turning position means a situation where the driver is going to take a left turn or a right turn at an intersection or switch lanes. In either situation, because the driver has to confirm safety around the own vehicle carefully, it can be said that a driving load on the driver is relatively high.

It goes without saying that a method of determining whether it is a situation where a driving load on the driver is high is not limited to the method described above and a determination may be made by any other known method. A determination result of the driving load determination device 5 is outputted to the vehicle display device 1 one after another as driving load information.

The vehicle display device 1 includes the display portion 11, a vehicle interface portion (hereinafter, referred to as the vehicle IF portion) 12, a meter image generation portion 13, an external device interface (hereinafter, referred to as the external device IF portion) 14, a connected-device management portion 15, and a display control portion 17. The respective portions may be realized by hardware or software solely or in combination. The meter image generation portion 13, the connected-device management portion 15, and the display control portion 17 indicated as separate functional blocks may be realized by a single CPU instead.

The vehicle display device 1 displays an image image (meter image) representing vehicle information. In a case where the vehicle display device 1 receives an input of data on an image (external image) to be displayed on the display portion 11 from an external device connected to the self and it is not necessary to hide the external image, the vehicle display device 1 displays the meter image and the external image within one screen. It is necessary to hide the external image in a case where a condition designed as needed is satisfied, such as when a driving load on the driver is high as will be described below. Hereinafter, a configuration and an operation of the vehicle display device 1 will be described.

The display portion 11 is a known display panel disposed in front of a driver's seat within an instrument panel of the own vehicle and displays a display image inputted from the display control portion 17. The display portion 11 is capable of displaying a full-color image and can be, for example, a TFT liquid crystal display or an organic EL display.

A backlight 111 provided to the display portion 11 outputs light at uniform luminance across an entire display region of the display portion 11. In short, the backlight 111 is incapable of raising or lowering luminance locally. The term, "luminance", referred to herein means an intensity of light (unit: cd/m2) emitted to a liquid crystal layer of the display panel. In the following description, luminance indicates light intensity of the backlight 111 and is distinguished from brightness indicating lightness of tones in an image. The backlight 111 corresponds to a light source.

The vehicle IF portion 12 functions as an input and output interface which enables the vehicle display device 1 to communicate with the in-vehicle ECU 2. The vehicle IF portion 12 acquires vehicle information from the in-vehicle ECU 2 and outputs the acquired vehicle information to the meter image generation portion 13 and the display control portion 17 one after another.

On the basis of the vehicle information inputted from the vehicle IF portion 12, the meter image generation portion 13 draws a meter image G1 indicating various types of element information belonging to the vehicle information and outputs data of the meter image G1 to the display control portion 17 one after another. More specifically, of all the types of element information belonging to the vehicle information, the meter image generation portion 13 draws an image (element information image) corresponding to element information of a type specified by the display control portion 17 or a predetermined type. The meter image generation portion 13 generates the meter image G1 by placing each image of such element information in a predetermined layout.

As with the external image, the meter image G1 is represented by RGBA. However, it goes without saying that colors may be represented by CYMK instead of RGB. It should be noted, however, that pixel information of the meter image G1 unexceptionally includes information specifying transparency no matter which representation system other than RGB is used.

Types of element information included in the meter image G1 may be determined according to a running state, such as whether the vehicle is running. The meter image G1 of the present embodiment includes a brightness adjustment filter region described below in addition to the element information image described above. The element information image may be a text alone.

Figure 2:
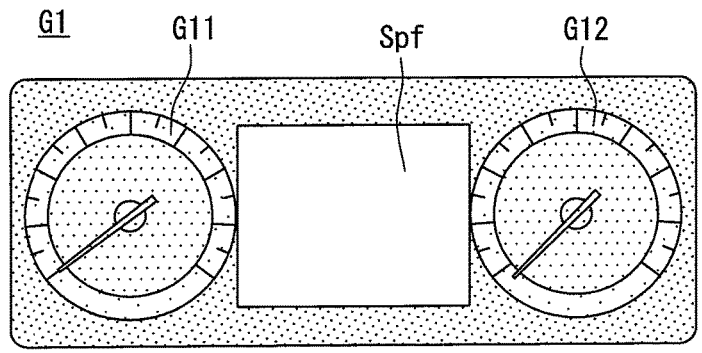
FIG. 2 shows an example of a meter image generated by a meter image generation portion.

FIG. 2 shows an example of the meter image G1 generated by the meter image generation portion 13. As is shown in FIG. 2, the meter image G1 includes a rotation speed meter G11 indicating an engine rotation speed, a vehicle speed meter G12 indicating a present vehicle speed, and a brightness adjustment filter region Spf. The rotation speed meter G11 and the vehicle speed meter G12 are disposed side by side with the brightness adjustment filter region Spf in between.

As an example, the rotation speed meter G11 is of a display form like so-called an analog meter which specifies a rotation speed detected by an engine rotation speed sensor by rotating a pointer on a calibrated scale image. As with the rotation speed meter G11, the vehicle speed meter G12 is also of a display form like an analog meter having a pointer that rotates in response to a detection value of a vehicle speed sensor. It goes without saying that the rotation speed meter G11 and the vehicle speed meter G12 may be of any other form, for example, in the form of a digital meter which indicates an engine rotation speed or a vehicle speed in figures.

Within the meter image G1, a region where neither the element information image, such as the rotation speed meter G11, nor the brightness adjustment filter region Spf is placed is a completely non-transparent background image. A color (to be more specific, an RGB value) of the background image is a dark color (at low brightness), such as black and dark gray, to prevent the driver from feeling too bright. Herein, a color of the background is black as an example. It should be noted that the element information image is also completely non-transparent.

The brightness adjustment filter region Spf is a region where transparency is adjusted according to a direction from the display control portion 17. Transparency of the brightness adjustment filter region Spf takes a same value in anywhere across the entire brightness adjustment filter region Spf. Also, a color of the brightness adjustment filter region Spf itself, that is, a color when transparency is 0% (basic color) is same as the color of the background image. When the background image has a pattern, the brightness adjustment filter region Spf may be an image having the same pattern.

When configured in the manner as above, an image same as the background image is displayed by adjusting transparency of the brightness adjustment filter region Spf to 0%. When transparency is other than 0%, an image placed behind and superimposed on the meter image G1 is allowed to pass through the brightness adjustment filter region Spf according to the transparency and displayed. It should be noted, however, that because the color of the brightness adjustment filter region Spf itself is a dark color (herein, black), an image allowed to pass through the brightness adjustment filter region Spf when transparency is less than 100% is displayed darker than an original image.

By adjusting transparency of the brightness adjustment filter region Spf, brightness of an image placed behind the meter image G1 can be adjusted. In the present embodiment, an external image, such as a mobile image, is placed behind the meter image G1. The external image is displayed through the brightness adjustment filter region Spf. That is to say, the brightness adjustment filter region Spf serves to adjust brightness of the external image.

In a case where transparency of the brightness adjustment filter region Spf configured as above is set to 0%, even when an external image is inputted into the display portion 11, the external image is no longer displayed on the screen. In other words, the brightness adjustment filter region Spf can be also used to control a display state, that is, a displayed state or a hidden state, of the external image on the display portion 11.

The meter image G1 is generated in different layouts when an external image is displayed and when an external image is not displayed. The meter image generation portion 13 changes the layouts of the meter image G1 according to a direction from the display control portion 17 described below.

For ease of description, a layout of the meter image G1 when an external image is displayed is referred to as the external image display layout and a layout of the meter image G1 when an external image is not displayed is referred to as the external image hiding layout.

The external image display layout is the layout shown in FIG. 2 as described above. That is to say, the rotation speed meter G11, the brightness adjustment filter region Spf, and the vehicle speed meter G12 are placed side by side in a traverse direction of the screen (that is, a vehicle width direction) without overlapping one another.

The brightness adjustment filter region Spf in the external image display layout is of an oblong shape and a size of the oblong shape is hereinafter referred to as a basic size. A ratio of a lateral length and a longitudinal length of the oblong shape is 4:3 as an example. Alternatively, the ratio may be 16:9 or a ratio corresponding to an aspect ratio of an external image.

Figure 3:
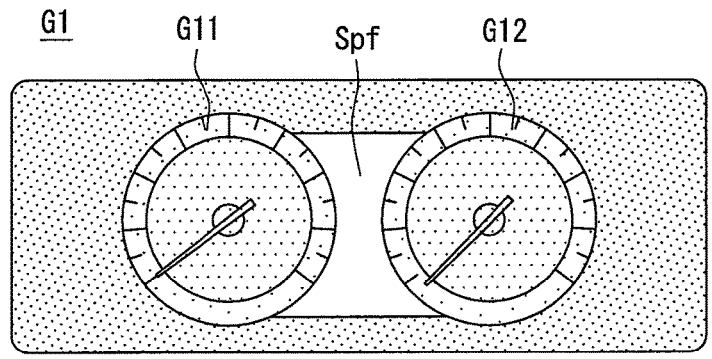
FIG. 3 shows another example of the meter image generated by the meter image generation portion.

On the other hand, in a case where an external image is not displayed, as is shown in FIG. 3, the rotation speed meter G11 and the vehicle speed meter G12 are moved closer to a center of the meter image G1 and displayed larger than the rotation speed meter G11 and the vehicle speed meter G12 displayed when an external image is displayed. Each of the rotation speed meter G11 and the vehicle speed meter G12 is placed so as to overlap the brightness adjustment filter region Spf.

In a case where the external image hiding layout is adopted, by displaying the element information images larger and closer to the center than the element information images displayed in the external image display layout, visibility of the element information images for the driver can be enhanced. The meter image generation portion 13 corresponds to a vehicle information image generation portion and the meter image G1 corresponds to a vehicle information image.

The external device IF portion 14 functions as a communication interface which enables the vehicle display device 1 to communicate with an external device (herein, the mobile terminal 3). The external device IF portion 14 acquires data, such as mobile image data, outputted from the mobile terminal 3 and provides the inputted data to the connected-device management portion 15.

The connected-device management portion 15 manages an external device connected to the vehicle display device 1. For example, upon acceptance of a request for a wireless communication connection from an external device via the external device IF portion 14, the connected-device management portion 15 performs processing to establish a communication connection with the external device and authentication processing. While a communication connection with the external device is established, the connected-device management portion 15 controls communications with the external device.

Upon acquisition of data of an external image from an external device connected to the vehicle display device 1, the connected-device management portion 15 outputs the data of the external image to the display control portion 17. Of functions furnished to the connected-device management portion 15, a function to acquire data of an external image from an external device and output the data to the display control portion 17 is referred to as an external image obtaining portion 151. In short, the external image obtaining portion 151 of the present embodiment acquires mobile image data via the external device IF portion 14.

The display control portion 17 is formed as a normal computer and has known components including a CPU, a non-volatile memory, such as a ROM and a flash memory, a volatile memory, such as a RAM, and an I/O, and a bus line interconnecting the foregoing components (none of which is shown in the drawing).

A storage portion 17M provided to the display control portion 17 is a storage region formed of the RAM, the flash memory, and the like provided to the display control portion 17. The storage portion 17M operates as a buffer which temporarily accumulates the meter image G1 generated by the meter image generation portion 13 and an external image obtained by the external image obtaining portion 151. Data of an image displayed at a start-up of the vehicle display device 1 and a program run on the CPU to perform various types of processing and data necessary for the processing are also stored in the storage portion 17M. The display control portion 17 realizes various functions when the program is run on the CPU.

Figure 4:
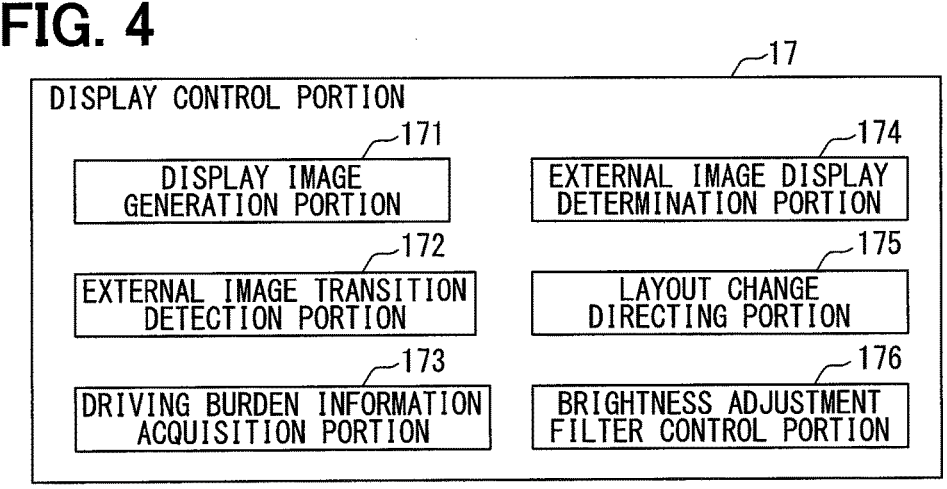
FIG. 4 is a block diagram showing an example of a schematic configuration of a display control portion in the first embodiment.

To be more specific, the display control portion 17 includes functional blocks shown in FIG. 4, namely, a display image generation portion 171, an external image transition detection portion 172, a driving load information acquisition portion 173, an external image display determination portion 174, a layout change directing portion 175, and a brightness adjustment filter control portion 176.

The display image generation portion 171 generates an image (display image) to be displayed on the display portion 11 on the basis of the meter image G1 inputted from the meter image generation portion 13 and an external image inputted from the external image obtaining portion 151. The display image generation portion 171 outputs the generated data to the display portion 11 one after another and controls the display portion 11 to display the generated data.

Figure 5:
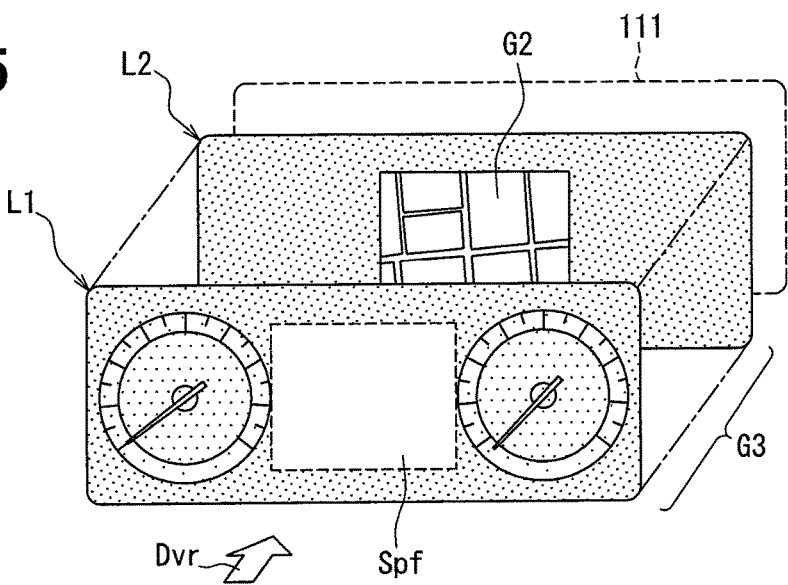
FIG. 5 is a conceptual view indicating a positional relation of an external image with respect to the meter image in a display image generated by a display image generation portion.

As an example, the display image generation portion 171 of the present embodiment generates a display image by superimposing images placed in multiple layers in a one-to-one correspondence. As is shown in FIG. 5, the display image generation portion 171 places the meter image G1 in a layer L1 on a forefront side (that is, an upper layer) viewed from the driver and an external image G2 in a layer L2 on a back side (that is, closer to the backlight 111) from the driver. The display image generation portion 171 generates a display image G3 shown in FIG. 6 by superimposing the images placed in the respective layers L1 and L2. An arrow Dvr of FIG. 5 indicates an eye direction of the driver. In addition, the layer L2 is a lower layer of the layer L1.

The external image G2 is located in the layer L2 so as to be superimposed on the brightness adjustment filter region Spf in the meter image G1. To be more specific, the external image G2 is located in such a manner that a center of the external image G2 falls on a center of the brightness adjustment filter region Spf in the meter image G1.

In the present embodiment, in a case where the basic size of the brightness adjustment filter region Spf and a size of the external image G2 are different, the size of the external image G2 is increased or reduced to match the basic size of the brightness adjustment filter region Spf to the extent that the aspect ratio of the external image G2 is maintained.

It goes without saying, however, that a configuration not to adjust a size of the external image G2 may be adopted or a size of the external image G2 may be adjusted without consideration of the aspect ratio in other embodiments.

Further, in the present embodiment, as an example, a region in the layer L2 other than the external image G2 is a non-transparent image same as the background image of the meter image G1. Hence, even in a case where the brightness adjustment filter region Spf has a region (void region) which is not superimposed on the external image G2 in either the longitudinal or lateral direction due to a difference of aspect ratios between the external image G2 and the brightness adjustment filter region Spf, the background image is displayed in the void region.

The external image transition detection portion 172 detects that an external device (herein, the mobile terminal) outputs an external image of a different screen type from a screen type which has been outputted. Hereinafter, an operation of the external device to output an external image of a different screen type from a screen type which has been outputted is referred to as transition of the external image.

Transition of the external image occurs when the user operates the input device 4 and makes an input operation involving transition of a screen type (function execution direction) for the external device. Accordingly, in the present embodiment, transition of the external image is assumed to have occurred when the user operates the input device 4 and inputs a function execution direction for the external device or makes a determination. The external image transition detection portion 172 determines an occurrence of transition of the external image when a control signal is inputted from the input device 4.

It goes without saying that the method of detecting transition of the external image is not limited to the method described above. In a case where the external device is configured to output data of the external image G2 with an identifier (screen ID) of a screen type of the external image G2, transition of the external image may be detected by comparing a screen ID obtained earlier with a newly-obtained screen ID.

Alternatively, the external image transition detection portion 172 may detect an occurrence of transition of the external image by comparison of an external image G2 obtained last time with a newly-obtained external image G2. Comparison of the external image G2 obtained last time with the newly-obtained external image G2 may be, for example, comparison of bits or pixels making up the data one by one or comparison of brightness distributions of pixels included in the images. When it is found from a comparison result that a change comparable to or greater than a predetermined threshold is occurring, transition of the external image is assumed to have occurred.

Upon detection of transition of the external image, the external image transition detection portion 172 outputs a signal indicating the occurrence of transition of the external image to the external image display determination portion 174.

The driving load information acquisition portion 173 acquires driving load information from the driving load determination device 5. That is to say, the driving load information acquisition portion 173 acquires information indicating whether it is a situation where a driving load on the driver is high. In the present embodiment, driving load information is acquired from the driving load determination device 5 provided outside the vehicle display device 1. It should be appreciated, however, that the present disclosure is not limited to the configuration as above. The driving load information acquisition portion 173 may be furnished with a function equivalent to the driving load determination device 5. In short, the drive load information acquisition portion 173 may determine whether it is a situation where a driving load on the driver is high on the basis of various types of vehicle information.

The driving burden information acquisition portion 173 outputs a signal indicating whether it is a situation where a driving burden on the driver is not high (normal situation) or it is a situation where a driving burden on the driver is high to the external image display determination portion 174 and the layout change directing portion 175. The driving burden information acquisition portion 173 corresponds to an example of a driving burden determination portion.

The external image display determination portion 174 determines whether the display control portion 17 is going to display an external image which has not been displayed up to an earlier time (that is, a predetermined time in the past) on the basis of information provided from the external image transition detection portion 172 and the driving load information acquisition portion 173. An external image which has not been displayed up to an earlier time is displayed in a case where an external image is displayed in circumstances where the external image has not been displayed or in a case where an external image different from an external image which has been displayed is newly displayed.

Hence, the external image display determination portion 174 determines that the display control portion 17 is going to display an external image which has not been displayed up to an earlier time when the external image transition detection portion 172 detects transition of the external image.

The display control portion 17 of the present embodiment performs processing (display form change processing) to change a display form of the display image G3 according to a driving load on the driver acquired by the driving load information acquisition portion 173.

The display form change processing is to hide the external image G2 when a driving load on the driver becomes high and to display the external image G2 again when a driving load on the driver is lessened and no longer high. Operations meant by the term, "hide", referred to herein include an operation to make the external image G2 unnoticeable by decreasing brightness.

By hiding the external image G2 that is relatively less useful for a driving operation when a driving load on the driver is high as above, visibility of the vehicle information displayed in the meter image G1 can be enhanced or the driver can concentrate on a driving operation.

An operation to display the hidden external image G2 again corresponds to an operation to display an external image which has not been displayed up to an earlier time. Hence, when the display control portion 17 performs processing (external image display processing) to display the hidden external image G2 again during the display form changing processing, the external image display determination portion 174 also determines that the display control portion 17 is going to display an external image which has not been displayed up to an earlier time.

The external image display processing is performed when a situation where a driving load on the driver is high changed to a normal situation while the external image G2 is inputted. That is to say, the external image display determination portion 174 determines that the display control portion 17 is going to display an external image which has not been displayed up to an earlier time when a situation where a driving load on the driver is high changed to a normal situation while the external image G2 is inputted. Whether a situation where a driving load on the driver is high changed to a normal situation may be determined on the basis of the driving load information inputted from the driving load information acquisition portion 173.

The layout change directing portion 175 directs the meter image generation portion 13 to change the layouts of the meter image G1 according to a driving load on the driver acquired by the driving load information acquisition portion 173. More specifically, when a driving load on the driver is high or when the external image G2 is not inputted, the layout of the meter image G1 is changed to the external image hiding layout. On the other hand, when it is a normal situation where a driving load on the driver is not high while the external image G2 is inputted, the meter image G1 is drawn in the external image display layout.

The brightness adjustment filter control portion 176 controls the meter image generation portion 13 to change transparency of the brightness adjustment filter region Spf. Transparency of the brightness adjustment filer region Spf is changed, for example, in a case where the brightness adjustment filter control portion 176 is informed of a determination by the external image display determination portion 174 that the display control portion 17 is going to display an external image which has not been displayed up to an earlier time.

When the external image display determination portion 174 determines that the display control portion 17 is going to display an external image which has not been displayed up to an earlier time, the brightness adjustment filter control portion 176 decreases transparency of the brightness adjustment filter region Spf once and then gradually increases the transparency. Consequently, a new external image G2 is displayed darkly at the beginning and gradually becomes brighter. Hereinafter, an operation and an effect of the vehicle display device 1, in particular, an operation and an effect of the brightness adjustment filter control portion 176 will be described using Operation Examples 1 through 3.

Operation Example 1

The following will describe processing (brightness adjustment display processing) performed when the external image display determination portion 174 determines that the display control portion 17 is going to display an external image which has not been displayed up to an earlier time on the grounds that the external image transition detection portion 172 detects transition of the external image.

The brightness adjustment display processing is processing to display a newly obtained external image G2 on the display portion 11 while adjusting brightness. The brightness adjustment display processing is processing performed by the display control portion 17 and the meter image generation portion 13 in cooperation with each other.

FIG. 7 shows a flowchart depicting an example of a procedure of the brightness adjustment display processing which is triggered when the external image transition detection portion 172 detects transition of the external image. It should be noted that the external image G2 is not updated when the flowchart is started and the presently displayed external image G2 is the external image G2 before transition.

Firstly in Step S11, the brightness adjustment filter control portion 176 decreases transparency of the brightness adjustment filter region Spf to a predetermined value (target low value Blw). Because the external image G2 behind the brightness adjustment filter region Spf is placed in the layer L2 closer to the backlight 111, the external image G2 becomes less bright than original brightness (including a hidden state) in the display image G3.

The target low value Blw may be a minimum value (that is, 0%) within a feasible range of the meter image generation portion 13 or a preliminarily set value other than the minimum value, for example, 10% or 20%. Herein, because a color of the brightness adjustment filter region Spf itself is dark, given that transparency is adjusted to a value other than 100% (that is, less than 100%), the displayed image can be darker than the original external image G2. Accordingly, transparency may be set to a value, such as 80% or 90%.

It is, however, more preferable to set the target low value Blw in such a manner that an external image G2 newly displayed is darker than an element information image in the meter image G1. Also, brightness of a newly-displayed external image G2 may possibly be extremely high. It is therefore preferable to set the target low value Blw to a value with which a newly-displayed external image G2 is displayed darker than an element information image in the meter image G1 even when brightness of the newly-displayed external image G2 is extremely high. In view of the foregoing circumstances, the target low value Blw is set to 0% in the present embodiment as an example.

Brightness of the meter image G1 is basically constant. Hence, the target low value Blw may be set on the grounds that brightness of the meter image G1 is known. It may be configured in such a manner that brightness of the meter image G1 is changed in response to a lighting state (ON or OFF) of the headlights as will be described in Operation Example 3 below. Even in such a case, brightness when the headlights are ON and brightness when the headlights are OFF remain constant at corresponding preliminarily set values. Hence, the target low value Blw corresponding to a lighting state of the headlights may be set in advance according to brightness of the meter image G1 corresponding to a lighting state of the headlights.

When processing in Step S11 is completed, advancement is made to Step S12. In Step S12, the display image generation portion 171 replaces the external image G2 placed in the layer L2 with a new external image G2. Subsequently, advancement is made to Step S13.

In Step S13, the brightness adjustment filter control portion 176 increases transparency of the brightness adjustment filter region Spf by a predetermined amount (unit adjustment amount). Subsequently, advancement is made to Step S14. In Step S14, whether transparency of the brightness adjustment filter region Spf has reached a predetermined value (target high value Bhi) is determined. When it is determined that transparency of the brightness adjustment filter region Spf has not reached the target high value Bhi (NO in Step S14), the flow returns to Step S13. Advancement is made to Step S14 after transparency of the brightness adjustment filter region Spf is increased again by the unit adjustment amount.

That is to say, by repeating Steps S13 and S14 until transparency of the brightness adjustment filter region Spf reaches the target high value Bhi, the external image G2 placed behind the brightness adjustment filter region Spf is displayed while gradually becoming brighter.

It may be configured to display the external image G2 by increasing brightness either continuously or step by step. In the present embodiment, brightness is increased continuously as shown in FIG. 8 as an example.

Figure 8:
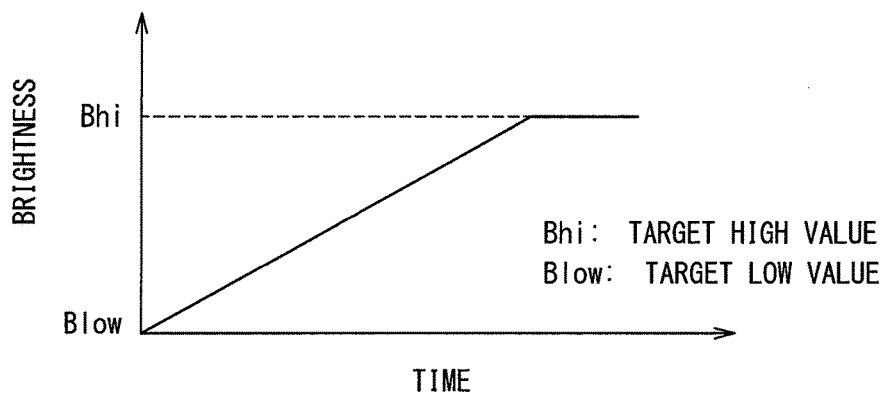
FIG. 8 is a chart showing a time variation in brightness of the external image in the display image.
Figure 9:
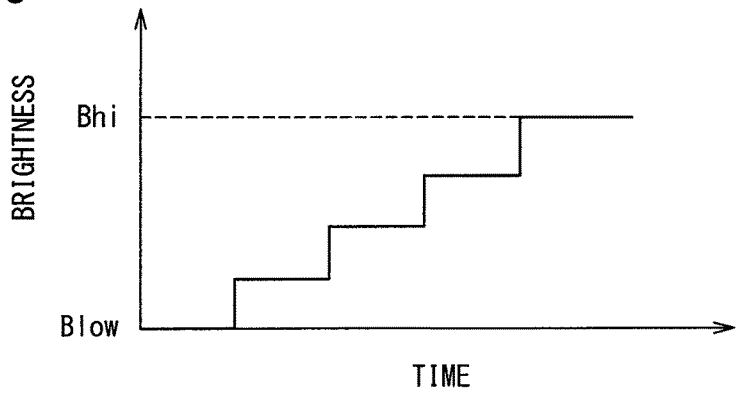
FIG. 9 is another chart showing a time variation in brightness of the external image in the display image.

For example, by setting the unit adjustment amount in Step S13 to a relatively small constant value, as is shown in FIG. 8, brightness of the external image G2 can be changed smoothly (substantially continuously). Also, by setting the unit adjustment amount in Step S13 to a relatively large value and increasing transparency after an elapse of a regular time in Step S13, as is shown in FIG. 9, brightness of the external image G2 can be increased step by step.

Figure 10:
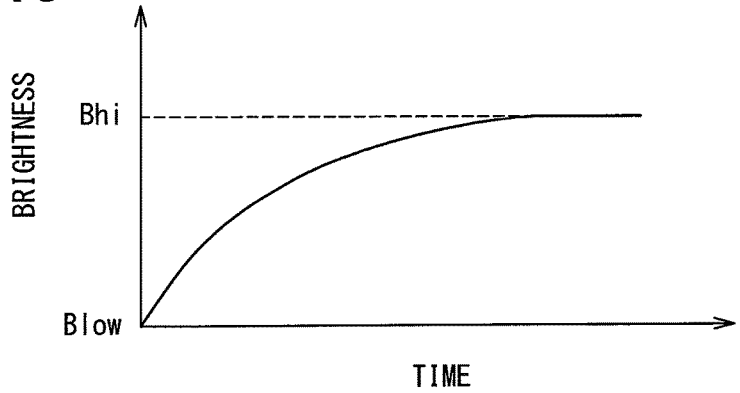
FIG. 10 is still another chart showing a time variation in brightness of the external image in the display image.

Further, as is shown in FIG. 10, brightness of the external image G2 may be adjusted in such a manner that an increase width of brightness per unit time is lessened with time. When configured in such a manner, in comparison with a case as shown in FIG. 8 where brightness is increased at a constant rate, brightness increases in a shorter time in a relatively dark region whereas brightness increases more slowly in a bright region.

Generally, when brightness is relatively low, a content of a newly displayed external image G2 as an outcome of the transition is hard to recognize for the driver. In addition, the driver does not want to have a too bright screen displayed suddenly whereas the driver wants to recognize a type of a new screen sooner. By adjusting brightness as shown in FIG. 10, the driver becomes able to recognize a content of the external image G2 sooner than by adjusting brightness according to the control pattern of FIG. 8. In addition, because an increase width of brightness per unit time is limited to be small in a bright region, the driver is able to adjust his eyes gradually to brightness.

When it is determined in Step S14 that transparency of the brightness adjustment filter region Spf has reached the target high value Bhi (YES in Step S14), the flow is ended.

The target high value Bhi used for a determination in Step S14 may be set to a maximum value (that is, 100%) within a feasible range of the meter image generation portion 13 or to a preliminarily set value other than the maximum value, for example, 95% or 90%. In the present embodiment, the target high value Bhi is set to 100%. However, the present disclosure is not limited to the case as above.

When transparency is 100%, the external image G2 is displayed at original brightness. In a case where brightness of the external image G2 is higher than brightness of the element information images G11 and G12, the external image G2 attracts more attention of the driver than the meter image G1 and visibility of the meter image G1 may possibly be reduced. In order to avoid such an inconvenience, the target high value Bhi may be set to a predetermined value less than 100% (90% or so). When the target high value Bhi is set to a predetermined value less than 100%, it may be configured in such a manner that the driver is allowed to increase transparency up to 100% by operating the input device 4.

Figure 11A:
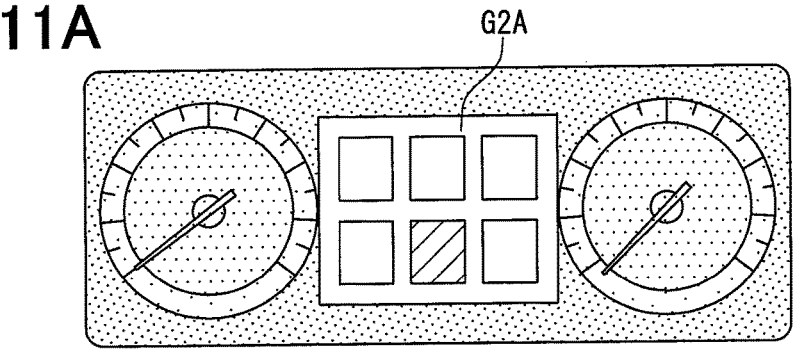
FIGS. 11A through 11D are views showing time variations of the display image while the brightness adjustment display processing is performed.

FIG. 11A through FIG. 11D show transition of a screen on the display portion 11 when a series of the steps in the brightness adjustment display processing described above is performed. FIG. 11A shows a display screen when the external image transition detection portion 172 detects transition of the external image in a state where the external image G2 has not been switched completely. For ease of description, G2A denotes the external image G2 before transition and G2B denotes the external image G2 after transition.

The external image G2A is, for example, an image showing a function selection screen (so-called a home screen) with which the driver selects a function to be performed by the mobile terminal 3. When the driver makes an operation on the function selection screen using the input device 4 to make the mobile terminal 3 perform a desired function (for example, a map display function), the external image transition detection portion 172 detects transition of the external image G2 and the brightness adjustment display processing depicted in FIG. 7 is started.

Figure 11B:
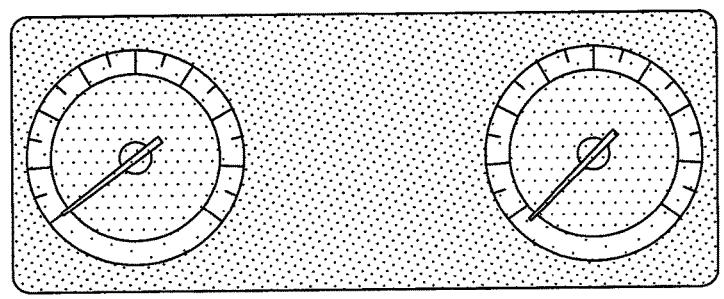

FIG. 11B shows the display screen immediately after Step S11 of FIG. 7 is completed. That is to say, transparency of the brightness adjustment filter region Spf is decreased to the target low value Blw (herein, 0%). Step S12 is performed quickly after Step S11 is completed. Hence, the external image G2A placed behind the brightness adjustment filter region Spf is updated to the external image G2B.

Figure 11C:
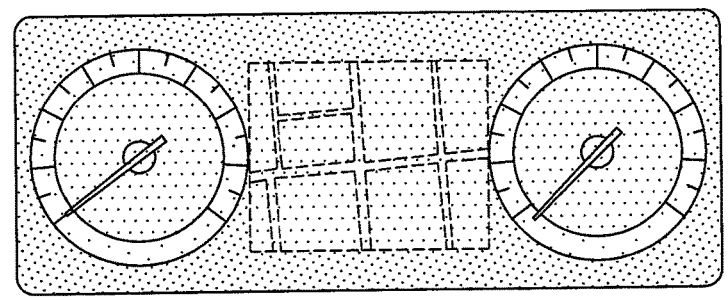
Figure 11D:
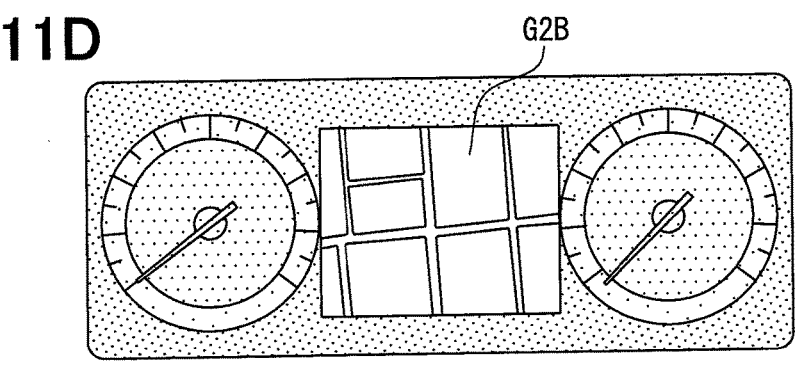

While Step S13 and Step S14 of FIG. 7 are repeated, as is shown in FIG. 11C, brightness of the external image G2B within the display screen gradually increases to an extent that the driver becomes aware of the external image G2B. In a case where transparency of the brightness adjustment filter region Spf reaches the target high value Bhi (herein, 100%) in Step S14, as is shown in FIG. 11D, the external image G2B is kept displayed intact.

As has been described, according to the configuration of the present embodiment, when the external image G2 is switched to an image of a screen type different from a screen type which has been displayed, the external image G2 is displayed by decreasing brightness once and the brightness is increased gradually. Hence, even when brightness of the external image G2B after transition is high in comparison with brightness of the external image G2A before transition, brightness of the external image G2 is not increased suddenly. Consequently, a possibility that the driver feels the switched external image G2 too bright can be reduced.

Operation Example 2

Figure 12:
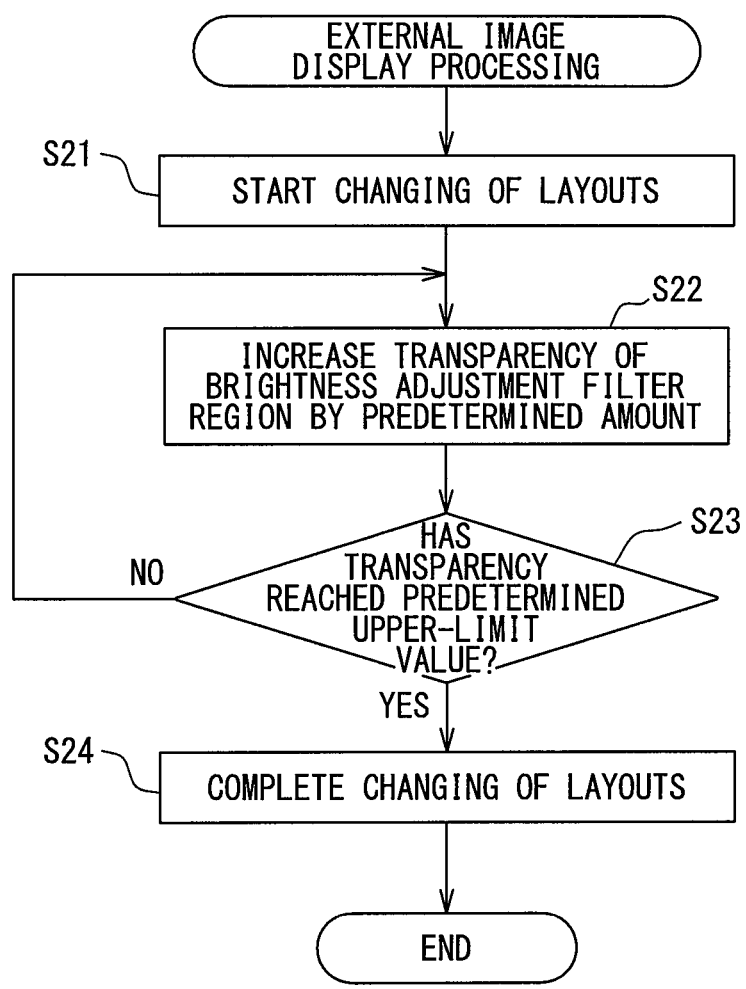
FIG. 12 is a flowchart depicting external image processing performed by the display control portion.

The following will describe the external image display processing by using a flowchart of FIG. 12. The external image display processing is performed by the display control portion 17 and the meter image generation portion 13 in cooperation with each other. As has been described above, the external image display processing is started when the external image display determination portion 174 determines that the display control portion 17 is going to display an external image which has not been displayed up to an earlier time on the grounds that a situation where a driving load on the driver is high changed to a normal situation.

FIG. 12 shows a flowchart depicting an example of a procedure of the external image display processing. The flowchart of FIG. 12 is started when a situation where a driving load on the driver is high changes to a situation where a driving load on the driver is not high. A driving load on the driver may be determined on the basis of the driving load information acquired by the driving load information acquisition portion 173.

When the flowchart is started, the external image G2 is kept hidden. That is to say, the meter image G1 is in the external image hiding layout as shown in FIG. 3 and transparency of the brightness adjustment filter region Spf is adjusted to a predetermined hiding level.

Figure 13A:
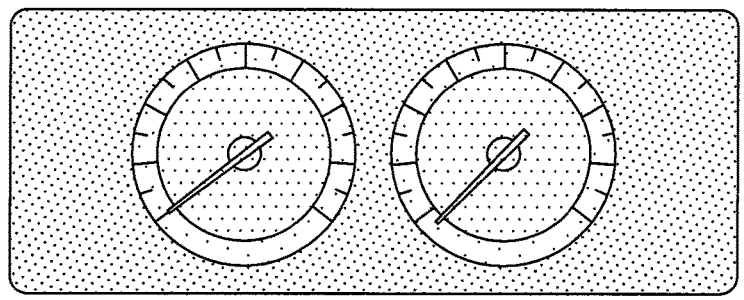
FIGS. 13A through 13C are views showing time variations of the display image while the external image display processing is performed.

The hiding level means transparency to achieve brightness at which the external image G2 is not displayed or displayed unnoticeably. More specifically, transparency with which the external image G2 is not displayed is 0% and transparency with which the external image G2 is displayed unnoticeably is a relatively small value, for example, 10% or 20%. In the present embodiment, the hiding level is set to 0%. Hence, in the present embodiment, a display screen on which the external image G2 is hidden is in a state as shown in FIG. 13A where the meter image G1 is in the external image hiding layout and transparency of the brightness adjustment filter region Spf is 0%.

Firstly in Step S21, the layout change directing portion 175 directs the meter image generation portion 13 to change the layouts of the meter image G1 from the external image hiding layout (see FIG. 3) to the external image display layout (see FIG. 2).

According to the direction from the layout change directing portion 175, the meter image generation portion 13 gradually moves the rotation speed meter G11 and the vehicle speed meter G12 within the meter image G1 from the locations in the external image hiding layout to the locations in the external image display layout. At the same time, the meter image generation portion 13 gradually reduces the rotation speed meter G11 and the vehicle speed meter G12 within the meter image G1 by changing a display size in the external image hiding layout to a display size in the external image display layout.

After the processing in Step S21 is performed, advancement is made to Step S22. In Step S22, the brightness adjustment filter control portion 176 increases transparency of the brightness adjustment filter region Spf by the unit adjustment amount. Subsequently, advancement is made to Step S23. In Step S23, whether transparence of the brightness adjustment filter region Spf has reached the target high value Bhi is determined. When it is determined that transparency of the brightness adjustment filter region Spf has not reached the target high value Bhi (NO in Step S23), the flow returns to Step S22 and advancement is made to Step S23 after transparency of the brightness adjustment filter region Spf is increased again by the predetermined amount.

That is to say, by repeating Step S22 and Step S23 until transparency of the brightness adjustment filter region Spf reaches the target high value Bhi, the external image G2 placed behind the brightness adjustment filter region Spf is displayed while gradually becoming brighter. It should be noted that the locations and the display size of the rotation speed meter G11 and the vehicle speed meter G12 in the meter image G1 are kept changed gradually to the locations and the display size in the external image display layout while Step S22 and Step S23 are repeated.

When it is determined in Step S23 that transparency of the brightness adjustment filter region Spf has reached the target high value Bhi (YES in Step S23), advancement is made to Step S24. In Step S24, changing of the meter image G1 to the external image display layout is completed. In the present embodiment, it is configured in such a manner that changing of the layouts of the meter image G1 is completed after transparency of the brightness adjustment filter region Spf reaches the target high value Bhi as an example. It should be appreciated, however, that the present disclosure is not limited to the configuration in the present embodiment. Changing of the layouts of the meter image G1 may be completed while Step S22 and Step S23 are repeated.

Figure 13B:
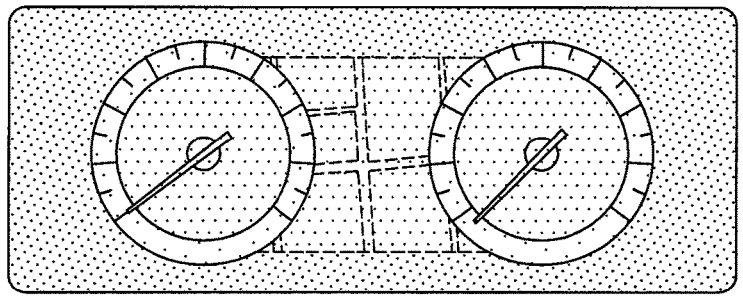
Figure 13C:
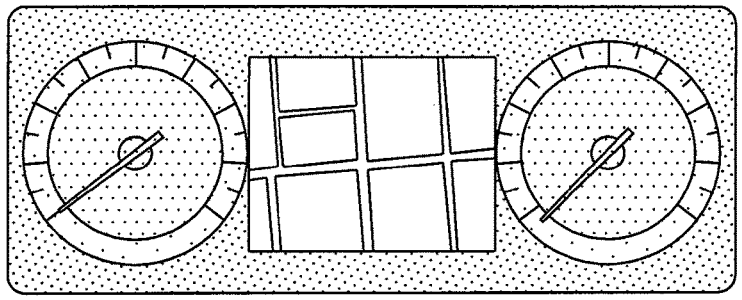

FIG. 13A through FIG. 13C show transition of a screen on the display portion 11 when a series of the steps in the external image display processing described above is performed. FIG. 13A shows a display screen when the external image G2 is hidden as described above. FIG. 13B shows a display screen while Step S22 and Step S23 are repeated. That is to say, FIG. 13B shows a screen in the process of increasing transparency of the brightness adjustment filter region Spf and making the rotation speed meter G11 and the vehicle speed meter G12 smaller while separating one from the other.

A size of the brightness adjustment filter region Spf is restored to the basic size and transparence is also gradually increasing in the course of the processing. Hence, display of the external image G2 begins gradually. When changing of the layouts of the meter image G1 and adjustment of transparency of the brightness adjustment filter region Spf are completed, the external image G2 is displayed as is shown in FIG. 13C.

As has been described above, according to the configuration of the present embodiment, when a state where the external image G2 is not displayed is changed to a state where the external image G2 is displayed, as in Operation Example 1 above, the external image G2 darkened once is displayed by gradually becoming brighter. Hence, even when brightness of the external image G2 is relatively high, a bright image is not displayed suddenly. In short, a possibility that the driver feels the displayed external image G2 too bright can be reduced.

The above has described a case where the external image G2 hidden due to a high driving load on the driver is displayed again when a driving load is lessened as an example of a case where an external image G2 is newly displayed in circumstances where the external image G2 has not been displayed. It should be appreciated, however, that the present disclosure is not limited to the example described above.

The external image display processing described above is also applicable to a case where the external image G2 is displayed in addition to the meter image G1 upon input of external image data from an external device in circumstances where the external image data has not been inputted from the external device.

Operation Example 3

Further, the vehicle display device 1 may adjust transparency of the brightness adjustment filter region Spf in response to a change in output (that is, luminance) of the backlight 111. The following will describe an operation and an effect in such a case.

Luminance of the backlight 111 changes, for example, when a lighting state (ON or OFF) of the headlights (not shown) is switched. It is generally anticipated that the headlights are OFF during daytime under bright circumstances. Hence, luminance of the backlight 111 is set relatively high. A state in which the headlights are OFF and luminance of the backlight 111 is relatively high as above is referred to as the day mode.

On the other hand, it is anticipated that the headlights are ON when the vehicle is running through a tunnel or running at night under dark circumstances. Hence, when the headlights are ON, luminance of the headlights is lowered than luminance when the headlights are OFF to prevent the driver from feeling that light on the display is too bright. A state in which the headlights are ON and luminance of the backlight 111 is lowered as above is referred to as the night mode.

That is to say, when the day mode is switched to the night mode, luminance of the backlight 111 is lowered whereas luminance of the backlight 111 is raised when the night mode is switched to the day mode.

When the day mode is switched to the night mode, the meter image generation portion 13 generates the meter image G1 in a tone suitable to luminance of the backlight 111 in the night mode. Hence, even when luminance of the backlight is lowered, visibility of the meter image G1 displayed on the screen of the display portion 11 can be maintained.

Figure 14:
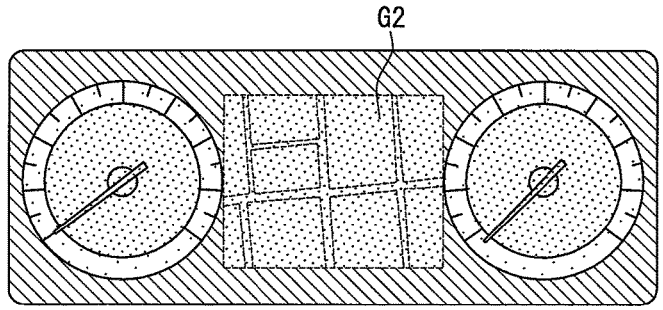
FIG. 14 shows an example of a display screen when luminance of a backlight is lowered.

However, because the external image G2 is an image obtained from an external, such as the mobile terminal 3, a tone of the image outputted to the vehicle display device 1 is not changed in response to a lighting state of the headlights. Hence, the external image G2 displayed on the screen of the display portion 11 becomes darker when luminance of the backlight 111 is lowered as is shown in, for example, FIG. 14.

In particular, in a case where transparency of the brightness adjustment filter region Spf in the day mode is set to, for example, 85% with which the external image G2 is displayed at decreased brightness, the external image G2 becomes too dark when luminance of the backlight 111 is lowered while transparency is held at the set value. Visibility of the external image G2 is thus reduced.

In order to overcome such an inconvenience, the display control portion 17 adjusts transparency of the brightness adjustment filter region Spf when the day mode is switched to the night mode to prevent the external image G2 from becoming too dark due to limitation of luminance of the backlight 111.

To be more specific, when transparence is presently adjusted to 85%, brightness of the external image G2 on the display screen is increased by gradually increasing transparency to a predetermined target adjustment value. The target adjustment value is a value at which an increase of transparency is stopped and set to a constant value, for example, 100%. Alternatively, it may be configured in such a manner that brightness of the external image G2 in the display image G3, that is, brightness of the external image G2 superimposed on the brightness adjustment filter region Spf takes a value equal to (including a value substantially coinciding with) a value of brightness of an element information image, such as the vehicle speed meter G12.

Figure 15:
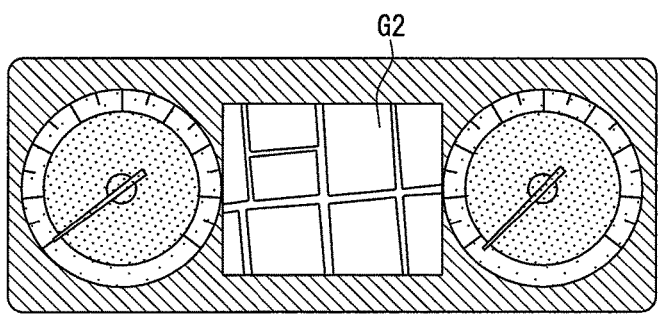
FIG. 15 is a view used to describe an effect by Operation Example 3.

As has been described above, when luminance of the backlight 111 is lowered, not only the meter image G1 but also the external image G2 can be displayed brightly as shown in FIG. 15 by increasing transparency of the brightness adjustment filter region Spf. In short, according to an operation in Operation Example 3, even when luminance of the backlight 111 is lowered, visibility of the external image G2 can be maintained.

Transparency of the brightness adjustment filter region Spf may start to increase after luminance of the backlight 111 is lowered to a predetermined value when the day mode is switched to the night mode. When configured as above, the external image G2 which is displayed darkly on the display screen at the beginning gradually becomes brighter.

Alternatively, transparency of the brightness adjustment filter region Spf may start to increase after an operation to lower luminance of the backlight 111 is started when the day mode is switched to the night mode.

While the above has described adjustment of transparency of the brightness adjustment filter region Spf when the day mode is switched to the night mode, transparency of the brightness adjustment filter region Spf may be adjusted adequately when the night mode is switched to the day mode. For example, as in Operation Example 1 above, transparency is lowered to the target low value Blw once before luminance of the backlight 111 is changed to a value in the day mode and transparency is gradually increased to the target high value Bhi after luminance of the backlight 111 is changed to the value in the day mode.

As has been described above, by adjusting transparency of the brightness adjustment filter region Spf in response to a change in luminance of the backlight 111, visibility of the external image G2 can be maintained.

Operation Example 4

In the embodiment described above, when the display control portion 17 displays the display image G3 including an image indicating high-priority information, for example, an image (warning image) notifying the driver of an occurrence of an abnormal state in the own vehicle, as an element information image on the display portion, transparency of the brightness adjustment filter region Spf may be controlled to display the external image G2 darker than in a case where no abnormal state is occurring (normal time).

That is to say, when a warning image is displayed, the brightness adjustment filter control portion 176 changes transparency of the brightness adjustment filter region Spf to a value (for example, 80%) a certain amount lower than transparency in the normal time (for example, the target high value Bhi). The following will describe a specific configuration and an operation in Operation Example 4.

When the in-vehicle ECU 2 detects an occurrence of an abnormal state in the own vehicle or acquires such information from another ECU, the in-vehicle ECU 2 outputs a signal (warning signal) indicating the occurrence of an abnormal state and a content of the abnormal state to the vehicle display device 1. The warning signal is included in the vehicle information described above.

Examples of the abnormal state include but not limited to cases where a remaining amount of fuel falls below a predetermined threshold, an occupant fails to put on a seat-belt, a door or a trunk is left open, and oil is leaking. An abnormal state outputted in the form of the warning signal, in other words, a type of information notified preferentially to the driver may be designed as needed.

In a case where the warning signal is inputted, the meter image generation portion 13 generates the meter image G1 including an element information image corresponding to the abnormal state indicated by the warning signal and outputs data of the generated meter image G1 to the display control portion 17.

The warning signal outputted from the in-vehicle ECU 2 is inputted into not only the meter image generation portion 13 but also the display control portion 17 via the vehicle IF portion 12. Hence, in a case where the warning signal is outputted from the in-vehicle ECU 2, the display control portion 17 recognizes that the meter image generation portion 13 is providing the meter image G1 including the warning image to the display control portion 17 on the basis of the warning signal.

When the brightness adjustment filter control portion 176 of the display control portion 17 recognizes that the meter image G1 including the warning image is inputted from the meter image generation portion 13, the brightness adjustment filter control portion 176 directs the meter image generation portion 13 to change transparency of the brightness adjustment filter region Spf to a value (brightness limiting value) a certain amount less than a normal set value. The brightness limiting value may be set appropriately within a range in which the external image G2 is displayed darker than normal brightness. When transparency of the brightness adjustment filter region Spf is set to the target high value Bhi for the external image G2 in normal time, the brightness limiting value can be any value smaller than the target high value Bhi. Herein, the brightness limiting value is set to 80% as an example.

According to a direction from the brightness adjustment filter control portion 176, the meter image generation portion 13 changes transparency of the brightness adjustment filter region Spf to the brightness limiting value either gradually or instantaneously and provides the resulting meter image G1 to the display control portion 17. The display image generation portion 171 generates the display image G3 by superimposing the external image G2 on the provided meter image G1, that is, the meter image G1 including the warning image and the brightness adjustment filter region Spf with transparency decreased to the brightness limiting value, and controls the display portion 11 to display the display image G3 thus generated.

According to the configuration of Operation Example 4 described above, when the warning image is displayed on the display portion 11, the external image G2 in the display image G3 is displayed darker than in normal time. Consequently, the warning image is made more noticeable and information indicated by the warning image can be preferentially presented to the driver.

While the embodiment of the present disclosure has been described, it should be appreciated that the present disclosure is not limited to the embodiment described above. Modifications described below are also within the technical scope of the present disclosure and the present disclosure can be implemented in various modifications other than the modifications below within the scope of the present disclosure.

For example, the embodiment above has described the configuration capable of realizing an operation in any one of Operation Examples 1 through 4 above. However, the present disclosure is not limited to the configuration as above. For example, the vehicle display device 1 may be configured to perform any one or two of Operation Examples 1 through 4 above. It should be noted, however, that the vehicle display device 1 is configured to perform at least either Operation Example 1 or Operation Example 2. When the vehicle display device 1 is configured not to perform Operation Example 1, the display control portion 17 does not have to include the external image transition detection portion 172. When the vehicle display device 1 is configured not to perform Operation Example 2, the driving load information acquisition portion 173 is not essentially included.

First Modification

In the description above, the basic color of the brightness adjustment filter region Spf is a dark color, such as black. Hence, the brightness adjustment filter region Spf serves to make a tone of the external image G2 in the display image G3 darker than an original tone.

However, when white is the basic color of the brightness adjustment filter region Spf, the brightness adjustment filter region Spf serves to make a tone of the external image G2 in the display image G3 lighter than the original tone according to transparency. That is to say, by setting transparency of the brightness adjustment filter region Spf having white as the basic color to a value less than 100%, the external image G2 can be displayed in a lighter tone than in the original image.

For example, in the case of Operation Example 3 above, when brightness of the external image G2 in the night mode is set to or blow the predetermined threshold, brightness of the external image G2 may be increased by a predetermined value by using the brightness adjustment filter region Spf having white as the basic color. In a case where brightness of the external image G2 in the display image is insufficient even when transparency of the brightness adjustment filter region Spf having black as the basic color is increased to 100%, transparency may be decreased by a predetermined value after the basic color of the brightness adjustment filter region Spf is changed to white.

The threshold referred to herein is a threshold on the basis of which a determination is made as to whether an image is too dark to be recognized by the driver and the threshold may be designed as needed. The basic color of the brightness adjustment filter region Spf may be changed by the display control portion 17.

Second Modification

The above has described the configuration by which brightness of the external image G2 in the display image G3 is adjusted by superimposing an image having predetermined transparency, that is, the brightness adjustment filter region Spf or a brightness adjustment image, on the external image G2 by way of example. It should be appreciated, however, that the present disclosure is not limited to the configuration described above. The external image G2 may be subject to image processing to change brightness.

Figure 16:
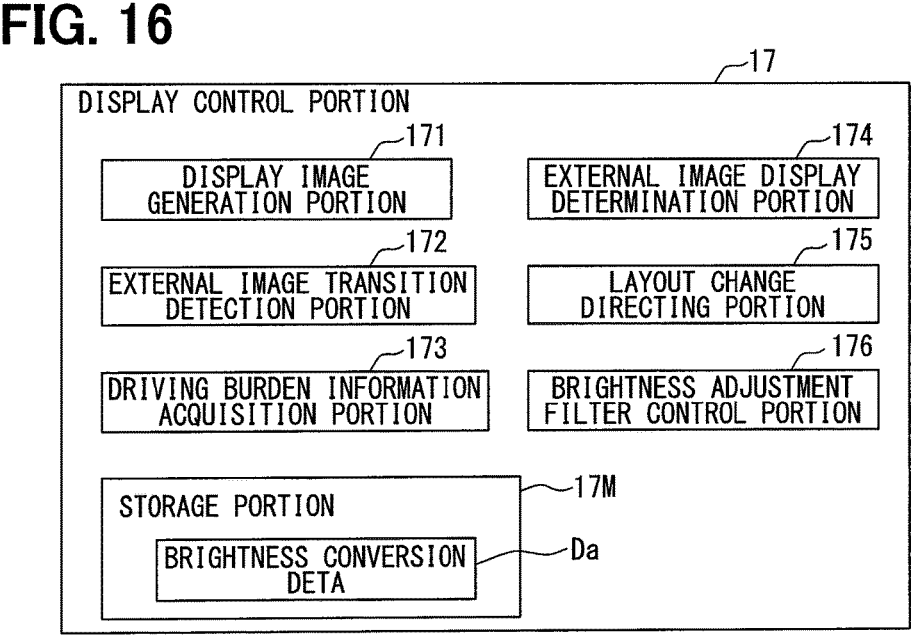
FIG. 16 is a block diagram showing an example of a configuration of a display control portion in a second modification.

FIG. 16 shows an example of a schematic configuration of the display control portion 17 according to the second modification. The display control portion 17 of the second modification includes a brightness adjustment portion 177 which performs image processing to change brightness on the external image G2 instead of the brightness adjustment filter control portion 176 described above. The storage portion 17M of the second modification stores data (brightness conversion data) Da indicating a correspondence relation of brightness for each color as data on the basis of which the brightness adjustment portion 177 performs the processing described above.

The brightness conversion data Da shows the correspondence relation when brightness is varied in multiple steps (for example, ten steps) for each color, such as red and blue. Information of the color may comply with the representation system of the external image G2, such as RGB, as described above. That is to say, the brightness conversion data Da is data correlating a color of an RGB value with an RGB value when the color is made darker (brighter) by one step.

The brightness adjustment portion 177 determines a color as an outcome when a color is made darker by a predetermined number of steps from certain color by referring to the brightness conversion data Da. Consequently, colors can be made darker (or brighter) step by step without having to change a color system of each pixel included in an image.

For example, in the case of the brightness adjustment display processing described in Operation Example 1 above, the brightness adjustment portion 177 generates an image (tone-adjusted external image) G2 by decreasing brightness of the external image G2 by a predetermined number of steps (for example, five steps) once and outputs the tone-adjusted external image G2 to the display image generation portion 171. The display image generation portion 171 generates the display image G3 using the tone-adjusted external image G2 provided from the brightness adjustment portion 177 and the meter image G1 and controls the display portion 11 to display the display image G3 thus generated.

While the brightness adjustment portion 177 is increasing brightness of the tone-adjusted external image G2 step by step by referring to the brightness conversion data Da, the external image G2 in the display image G3 also gradually becomes brighter. In Operation Example 2 and Operation Example 3 above, too, the brightness adjustment portion 177 may adjust brightness of the external image G2 and the display image generation portion 171 may generate a display image using the tone-adjusted external image G2 instead of the brightness adjustment filter control portion 176 and the brightness adjustment filter region Spf.

An amount of brightness of the external image G2 decreased by the brightness adjustment portion 177 may be determined dynamically according to original brightness of the external image G2. That is to say, an adjustment amount of brightness may be determined for each external image G2. In such a case, after brightness is decreased once, brightness of the respective external images G2 becomes equal regardless of the original brightness.

Brightness of the external image G2 may be determined by analyzing a frequency distribution in each step of brightness in a population formed of pixels making up an image. For example, brightness in a step to which a center value of a brightness distribution belongs may be given as brightness of the image. Once the brightness of the original image of the external image G2 is determined, an adjustment amount needed to decrease brightness of the image to target brightness can be determined.

The display image generation portion 171 of the second modification may generate the display image G3 by placing the tone-adjusted external image G2 behind a completely transparent region Spt in the meter image G1 shown in FIG. 16 and superimposing one on the other. Alternatively, in the second modification, the display image G3 may be generated by superimposing the external image G2 on the meter image G1.

It is noted that a flowchart or the processing of the flowchart in the present application includes sections (also referred to as steps), each of which is represented, for instance, as S11. Further, each section can be divided into several sub-sections while several sections can be combined into a single section. Furthermore, each of thus configured sections can be also referred to as a device, module, or means.

While the present disclosure has been described with reference to embodiments thereof, it is to be understood that the disclosure is not limited to the embodiments and constructions. The present disclosure is intended to cover various modification and equivalent arrangements. In addition, while the various combinations and configurations, other combinations and configurations, including more, less or only a single element, are also within the spirit and scope of the present disclosure.

What is claimed is:

1. A vehicle display device comprising:
a display that displays an image;
a vehicle information image generator that generates a vehicle information image indicative of vehicle information;
an external image obtaining device that obtains an external image, which is an image to be displayed on the display, from an external device connected to the vehicle display device;
a display controller that displays at least the vehicle information image on the display, and displays the vehicle information image and the external image on the display when the external image obtained by the external image obtaining device needs to be displayed on the display; and
an external image display determination device that determines whether the display controller is going to display the external image which was not displayed at a predetermined past time, wherein:
when the external image display determination device determines that the display controller is going to display the external image which was not displayed at the predetermined past time, the display controller displays the external image, which the display controller is going to display, on the display with gradually increasing brightness of the external image from the brightness that is lower by a predetermined amount than original brightness of the external image which was not displayed to predetermined brightness that is determined based on the original brightness of the external image which was not displayed;
the display controller includes a display image generator that generates a display image to be displayed on the display by superimposing images, each of which is arranged on one of a plurality of layers in which an upper layer is displayed on a display screen of the display in front of a lower layer;
the display image generator generates the display image by arranging the vehicle information image in the upper layer higher than a layer in which the external image is arranged;
the vehicle information image generated by the vehicle information image generator includes a brightness adjustment filter region, transparency of which is changed according to an instruction from the display controller, to display the external image arranged in the lower layer by changing the brightness of the external image according to the transparency of the brightness adjustment filter region;
the vehicle information image generator generates the vehicle information image by changing the transparency of the brightness adjustment filter region according to the instruction from the display controller;
the display controller includes a brightness adjustment filter controller that controls the vehicle information image generator to change the transparency of the brightness adjustment filter region;
when the external image display determination device determines that the display controller is going to display the external image which was not displayed at the predetermined past time, the brightness adjustment filter controller controls the vehicle information image generator to change the transparency of the brightness adjustment filter region so as to decrease the brightness of the external image in the display image by a predetermined amount, and then to change the transparency so as to gradually increase the brightness of the external image in the display image; and
wherein the brightness adjustment filter region is arranged only in a part of the upper layer.

2. The vehicle display device according to claim 1, wherein:
when the external image display determination device determines that the display controller is going to display the external image which was not displayed at the predetermined past time, the display controller displays the external image, which the display controller is going to display, on the display with gradually increasing the brightness of the external image from the brightness that is lower than brightness of the vehicle information image to the original brightness of the external image.

3. The vehicle display device according to claim 1, wherein:
the display controller includes:
a display image generator that generates a display image to be displayed on the display by superimposing the external image and the vehicle information image; and
a brightness adjuster that adjusts the brightness of the external image; and
when the external image display determination device determines that the display controller is going to display the external image which was not displayed at the predetermined past time, the brightness adjuster adjusts the brightness of the external image, which the display controller is going to display on the display, so as to be displayed with gradually increasing the brightness from the brightness that is lower by the predetermined amount than the original brightness of the external image which was not displayed.

4. The vehicle display device according to claim 3, wherein:
the display controller includes a storage that stores brightness conversion data indicative of a correspondence relationship of brightness for each color; and
the brightness adjuster decreases or increases brightness of the external image according to the brightness conversion data in a stepwise manner.

5. The vehicle display device according to claim 1, further comprising:
an external image transition detector that detects that a new external image inputted from the external device transits to a new screen type different from a screen type of an old external image which has been inputted, wherein:
the external image display determination device determines that the display controller is going to display the external image which was not displayed at the predetermined past time when the external image transition detector detects that the new external image inputted from the external device transits to the new screen type different from the screen type of the old external image which has been inputted in a case where the display controller displays both of the vehicle information image and the old external image on the display.

6. The vehicle display device according to claim 5, further comprising:
an input device through which a driver inputs an instruction to the external device, wherein:
when the driver operates the input device, the input device outputs a control signal, showing that the operation is made on the input device, to the external image transition detector; and
when the control signal is input from the input device into the external image transition detector, the external image transition detector determines that the new external image inputted from the external device transits to the new screen type different from the screen type of the old external image which has been inputted.

7. The vehicle display device according to claim 5, wherein:
the new external image inputted from the external device is the external image which was not displayed at the predetermined past time; and
the old external image which has been inputted is the external image presently displayed.

8. The vehicle display device according to claim 1, further comprising:
a driving load determination device that determines whether a driving load of a driver is in a state to be higher than a predetermined value, wherein:
the display controller displays the external image on the display when the driving load determination device does not determine that the driving load of the driver is in a state to be higher than the predetermined value in a case where the external image obtaining device obtains the external image;
the display controller does not display the external image on the display when the driving load determination device determines that the driving load of the driver is in a state to be higher than the predetermined value even in a case where the external image obtaining device obtains the external image; and
the external image display determination device determines that the display controller is going to display the external image which was not displayed at the predetermined past time when the driving load determination device determines that the driving load of the driver is changed from a state to be higher than the predetermined value to a state to be lower than the predetermined value in a case where the external image is inputted.

9. The vehicle display device according to claim 1, wherein:
when luminance of a light source of the display falls below a predetermined value while the display controller displays the external image, the display controller increases brightness of the external image by a predetermined amount.

10. The vehicle display device according to claim 1, wherein:
when luminance of a light source of the display exceeds a predetermined value while the display controller displays the external image, the display controller decreases brightness of the external image by a predetermined amount.

11. The vehicle display device according to claim 1, wherein:
when a predetermined abnormal state occurs in a vehicle, the vehicle information image generator generates the vehicle information image including a warning image which notifies a driver of the abnormal state; and
when the vehicle information image generator generates the vehicle information image including the warning image while the display controller displays the external image, the display controller decreases brightness of the external image by a predetermined amount from brightness of the external image in a case where the vehicle information image generator generates the vehicle information image without the warning image.

12. The vehicle display device according to claim 1, wherein:
the predetermined past time is a time immediately before a present time.

13. The vehicle display device according to claim 1, wherein:
the upper layer includes only the vehicle information image and the brightness adjustment filter region; and
the lower layer includes only the external image, which faces the brightness adjustment filter region.

14. The vehicle display device according to claim 1, wherein the external image is displayed in the lower layer such that a center of the external image aligns with a center of the brightness adjustment filter region.

15. The vehicle display device according to claim 1, wherein when a size of the brightness adjustment filter region is different from a size of the external image, the size of the external image is increased or decreased to match the size of the brightness adjustment filter region while maintaining an aspect ratio of the external image.

* * * * *